(12) United States Patent
Sinai et al.

(10) Patent No.: US 6,560,956 B1
(45) Date of Patent: *May 13, 2003

(54) MULTI-FUEL, COMBINED CYCLE POWER PLANT

(75) Inventors: Joseph Sinai, Ramat Gan (IL); Uri Kaplan, Doar Na Emek Sorek (IL)

(73) Assignee: Ormat Industries Ltd., Yavne (IL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/044,111

(22) Filed: Mar. 19, 1998

(51) Int. Cl.$^7$ ................................................. F02C 6/18
(52) U.S. Cl. ................................................. 60/39.182
(58) Field of Search ........................ 60/39.182; 122/7 B

(56) References Cited

U.S. PATENT DOCUMENTS 3,832,845 A * 9/1974 Aguet .................... 60/39.13 B
4,845,942 A * 7/1989 Schemenau et al. ........ 60/39.12
4,896,496 A * 1/1990 Zervos ....................... 60/39.02

* cited by examiner

Primary Examiner—Ehud Gartenberg
(74) Attorney, Agent, or Firm—Nath & Associates PLLC; Gary M. Nath; Jerald L. Meyer

(57) ABSTRACT

A power plant includes a prime mover for burning fuel and producing work and hot exhaust gases, and heat exchanger apparatus that is responsive to the hot exhaust gases and to pre-heated steam condensate for converting the latter into high-pressure steam and for producing heat depleted exhaust gases. A combustor, preferably, a fluidized bed combustor, is responsive to burning fuel for supplying additional heat to a product of the heat exchanger apparatus, and producing combustion products. The combustion products are supplied to a superheater for producing superheated, high pressure steam from the high pressure steam supplied from the heat exchange apparatus. A high pressure steam turbine expands the superheated, high pressure steam and produces power and exhaust steam that is condensed to steam condensate in a condenser. Finally, the power plant includes an economizer that is responsive to the heat-depleted combustion products and to the steam condensate for producing the pre-heated condensate used by the heat exchange apparatus.

18 Claims, 3 Drawing Sheets

MULTI-FUEL, COMBINED CYCLE POWER PLANT

TECHNICAL FIELD

This invention relates to a multi-fuel, combined cycle power plant.

BACKGROUND

For many years, large scale gas turbine based stationary power plants fueled by conventional gas or liquid fuels, such as natural gas, liquefied petroleum gas (LPG), etc., have been used by utilities for peaking purposes because of the fast, on-line response of a gas turbine, and the relatively low cost of large gas turbine plants. More recently, combined cycle power plants have been constructed to increase the efficiency of the system thus enabling the gas turbine to be incorporated into power plants that provide base load electric power. Such power plants include a waste heat boiler that extracts heat from the exhaust gases of the gas turbine for generating steam that drives a steam turbine and produces additional power. Furthermore, sometimes supplementary duct firing has been used as an addition to the waste heat boiler.

At the same time, efforts have been made to utilize less expensive, and more abundant low heat content solid fuels, such as low quality coal, oil shale, bituminous phosphates, biomass, etc., in base-line power plants. Conventionally, power plants using such low heat content fuels have employed fluidized bed combustors that include integral heat transfer elements for generating steam. Examples of such power plants are disclosed in application Ser. No. 08/747,400 filed Nov. 12, 1996, the disclosure of which is hereby incorporated by reference.

It is an object of the present invention to provide a new and improved combined cycle power plant operating on low cost solid fuel in which several of the disadvantages outlined are reduced or substantially overcome.

DISCLOSURE OF INVENTION

A power plant according to the present invention includes a prime mover for burning fuel and producing work and hot exhaust gases, and heat exchanger apparatus that is responsive to the hot exhaust gases and to pre-heated steam condensate for converting the latter into a heated water product, e.g., high pressure steam, and for producing heat depleted exhaust gases. A combustor, preferably, a fluidized bed combustor, and part of a combustor-heat exchanger apparatus, is responsive to burning fuel, such as low cost solid fuel, for supplying additional heat to a product of the heat exchanger apparatus, and producing combustion products. The combustion products are supplied to a superheater for producing superheated, high pressure steam from the high pressure steam which is a product of the heat exchanger apparatus. A high pressure steam turbine expands the superheated high pressure steam and produces power and exhaust steam that is condensed to steam condensate in a condenser. Finally, the power plant includes an economizer that is responsive to heat-depleted combustion products and to the steam condensate for producing the pre-heated steam condensate used by the heat exchanger apparatus.

One form of the prime mover includes a gas turbine unit having a compressor for producing compressed air, a burner for combusting fuel and heating said compressed air to produce heated gases, and a turbine for expanding the heated compressed gases and driving the compressor.

In one embodiment of the present invention, the combustor receives the heat depleted exhaust gases produced by the heat exchanger apparatus. When the combustor is a fluidized bed combustor, the heat depleted exhaust gases serve to fluidize said combustor.

Preferably, the heat exchanger apparatus includes a first vaporizer responsive to the hot exhaust gases from the gas turbine, and to a portion of the pre-heated condensate for converting the latter into high pressure steam and producing the heat depleted exhaust gases. The additional heat supplied by the combustor is applied to the superheater containing the steam produced by the first vaporizer for converting the latter to superheated high pressure steam supplied to the high pressure steam turbine.

The power plant of the present invention may also include a second vaporizer interposed between the superheater and the economizer for extracting heat from the heat depleted combustion products supplied from the superheater and vaporizing an additional portion of the pre-heated condensate and producing further high pressure steam which is also supplied to the superheater.

BRIEF DESCRIPTION OF THE DRAWINGS

Embodiments of the present invention are shown by way of example with reference to the accompanying drawings, wherein.

DETAILED DESCRIPTION

Figure 1:
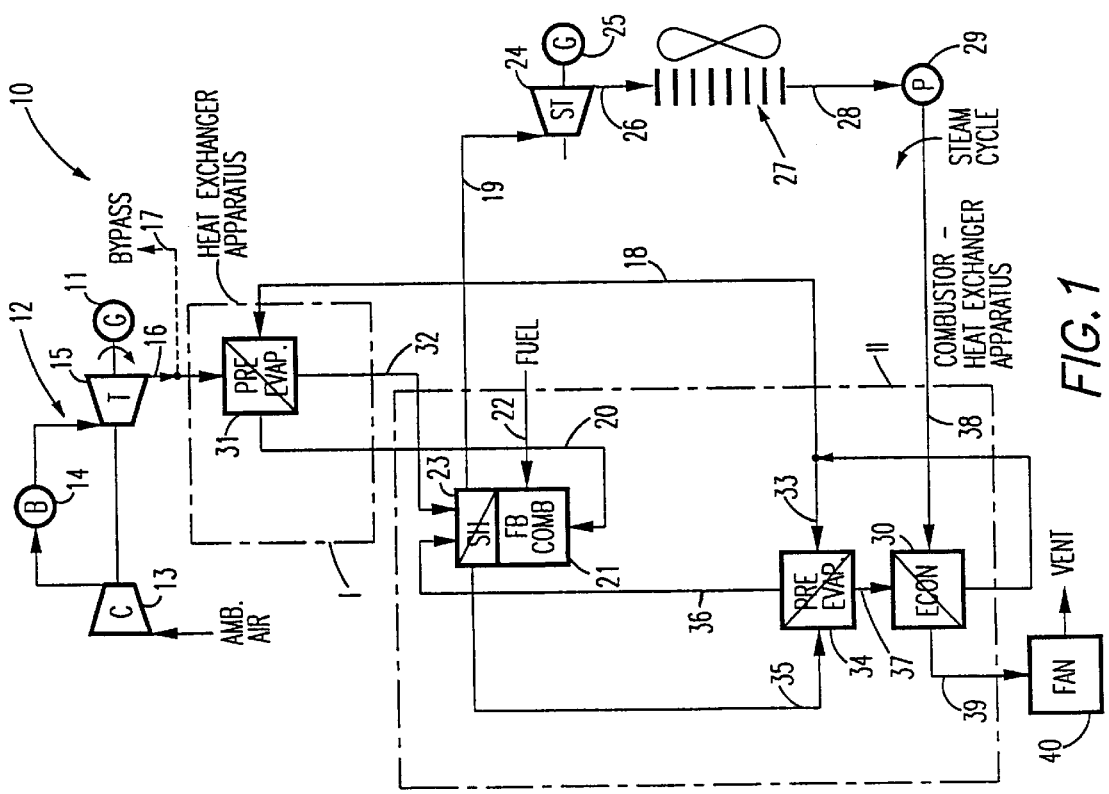
FIG. 1 is a first embodiment of the present invention utilizing a prime mover in the form of a gas turbine unit.

Turning now to the drawings, the first embodiment of a power plant according to the present invention is disclosed with reference to FIG. 1, designated in FIG. 1 as reference numeral 10. Power plant 10 includes prime mover in the form of gas turbine unit 12 having compressor 13 for compressing ambient air and burner 14 for combusting fuel, such as gaseous or liquid fuel, supplied thereto for heating compressed air supplied from compressor 13. Hot gases produced by burner 14 are supplied to turbine 15 for expanding the hot gases and producing power. Turbine 14 drives electric generator 11 as well as compressor 13.

Hot exhaust gases-exhausted from turbine 15 are supplied to first vaporizer 31 included in heat exchanger apparatus I for producing a heated water product, namely, high pressure steam, and heat depleted exhaust gases; and the high pressure steam, which is a product of heat exchanger apparatus I, is supplied to superheater 23. The heat depleted exhaust gases are supplied to combustor 21 present in combustor-heat exchanger apparatus II, preferably a fluidized bed combustor, for fluidizing fuel 22, such as low priced solid fuel, supplied to the combustor. The combustion products produced by combustion taking place in combustor 21 are furnished to superheater 23 for supplying additional heat and superheating high pressure steam and from which heat depleted combustion products are extracted. These heat depleted combustion products are then supplied to second vaporizer 34 for producing further high pressure steam which is also supplied to superheater 23 and from which further heat depleted combustion products exit. These further heat depleted combustion products flow to economizer 30 for producing pre-heated steam condensate. The pre-heated steam condensate is divided into two portions flowing in two flow lines and supplied to both first vaporizer 31, present in heat exchanger apparatus I, and second vaporizer 34, present in combustor-heat exchanger apparatus II. Cooled combustion products exit economizer 30 which are then furnished to fan 40 for supplying the products to the atmosphere. Optionally, fan 40 may not be used, thus, in such as a case, increasing the back pressure of the gas turbine.

Superheated high pressure steam exiting superheater 23 is supplied to high pressure steam turbine 24 for producing power and driving electric generator 25 from which exhaust steam exits. The exhaust steam is supplied to condenser 27 from producing steam condensate which is supplied by cycle pump 29 back to economizer 30 for producing pre-heated steam condensate.

The fuel supplied to burner 14 of gas turbine unit 12 is burned under excess air conditions enabling the exhaust gases to supply oxygen to combustor 21. However, at partial steam cycle operation, e.g., when the gas turbine unit is not operating, ambient air may be used for supplying combustion air to combustor 21. In such a case, fan 40 for supplying the products to the atmosphere needs to be used. Alternatively, gas turbine unit 12 may operate alone, without operating the steam cycle, by using bypass exhaust 17 for extracting the exhaust gases to the atmosphere.

Figure 2:
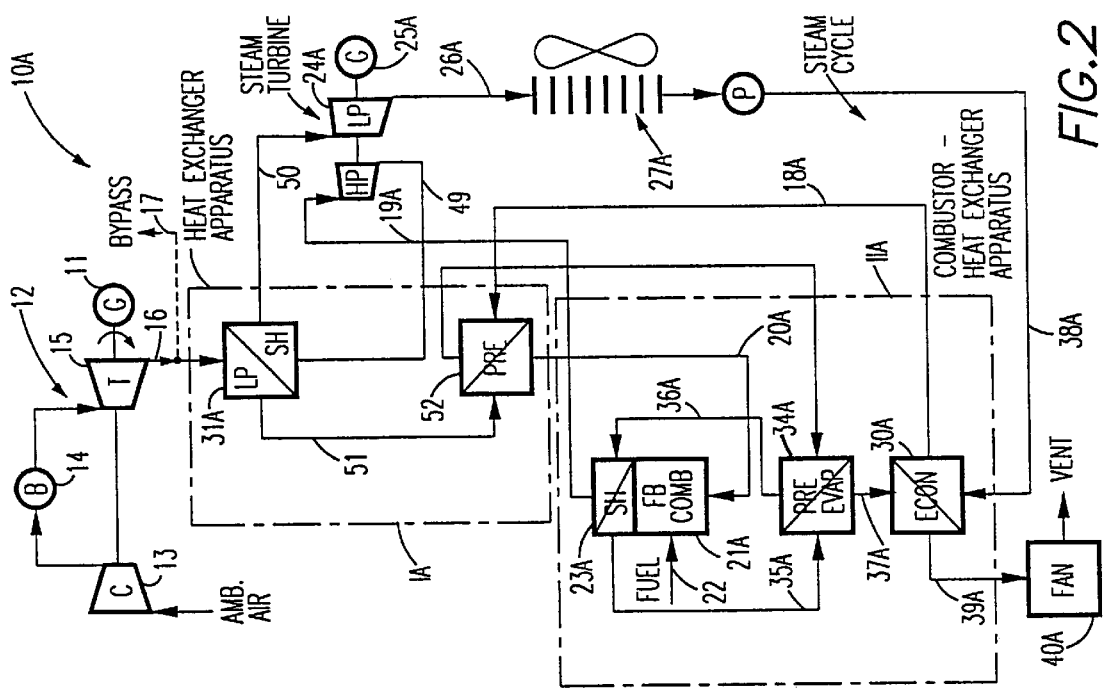
FIG. 2 is a second embodiment of the present invention utilizing a prime mover in the form of a gas turbine unit.

In the embodiment disclosed with reference to FIG. 2, designated as 10A in FIG. 2, the exhaust gases exhausting turbine 15 of prime mover taking the form of gas turbine unit 12 flow into low pressure superheater 31A present in heat exchanger apparatus IA. Heat depleted exhaust gases exiting low pressure superheater 31A are supplied via line 51 to pre-heater 52 also present in heat exchanger apparatus IA for producing a heated water product, namely, further pre-heated steam condensate and from which further heat depleted exhaust gas exits. The further heat depleted gas exiting pre-heater 52 is supplied to combustor 21A, present in combustor-heat exchanger apparatus IIA, preferably a fluidized bed combustor, for fluidizing fuel, such as low priced solid fuel, furnished from fuel source 22. Combustion products produced exit combustor 21A and are supplied to high pressure superheater 23A for producing superheated, high pressure steam which is supplied to the high pressure module of steam turbine 24A for producing power and driving electric generator 25A. Heat depleted combustion products exiting high pressure superheater 23A flow via line 35A to vaporizer 34A for vaporizing a product of heat exchanger apparatus IA, namely, further pre-heated steam condensate supplied from pre-heater 52. High pressure steam produced by vaporizer 34A is supplied to superheater 23A while further heat depleted combustion products exiting vaporizer 34A are supplied to economizer 30A. Economizer 30A produces pre-heated steam condensate from steam condensate supplied from steam condenser 27A while cooled combustion products exiting the economizer are furnished via line 39A to fan 40A for venting the cooled combustion products to the atmosphere. Also in this embodiment, optionally, fan 40A may not be used, thus, in such as a case, increasing the back pressure of the gas turbine.

The superheated, high pressure steam supplied to the high pressure module of steam turbine 24A expands therein, produces power and the exhaust steam exiting the high pressure module of steam turbine 24A is supplied to low pressure superheater 31A. Superheated, low pressure steam exiting low pressure superheater 31A is supplied to the low pressure module of steam turbine 24A for producing further power and also driving electric generator 25A. The low pressure, exhaust steam exiting the low pressure module of steam turbine 24A is supplied to steam condenser 27A for producing steam condensate which is supplied to economizer 30A by pump 29A.

Since, both in this embodiment and in the previous embodiment, heat is extracted from the exhaust gas exiting turbine 15 of gas turbine unit 12 before it is supplied to combustors 21 or 21A respectively, the temperature of the heat depleted exhaust gas entering the combustor is thus relatively cool (e.g., typically about 200° C.). This permits the size of these combustors to be relatively reduced. Note, however, that this temperature of heat depleted gas is still hot enough to do away with the use of an air pre-heater.

Figure 3:
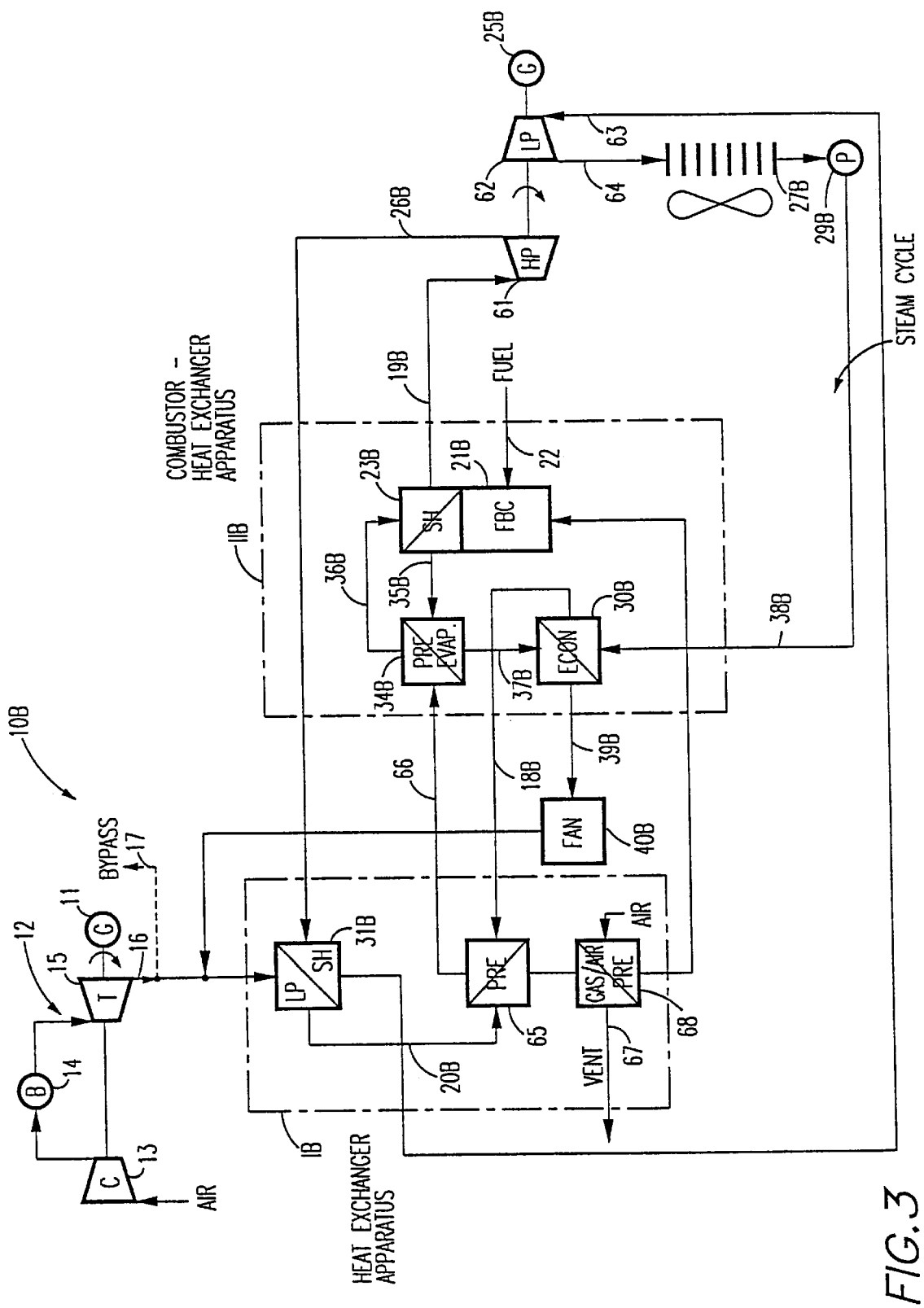
FIG. 3 is a third embodiment of the present invention utilizing a prime mover in the form of a gas turbine unit.

The embodiment disclosed with reference to FIG. 3, designated in FIG. 3 as 10B, also includes in heat exchanger apparatus IB low pressure superheater 31B which receives hot exhaust gases exiting turbine 15 of prime mover taking the form of gas turbine unit 12. In addition, pre-heater 65 is present in heat exchanger apparatus IB in this embodiment. Pre-heater 65 receives heat depleted exhaust gases via line 20B for producing a heated water product, namely, further pre-heated steam condensate and from which further heat depleted gases are supplied to gas/air pre-heater 68 and then vented to the atmosphere using vent 67.

In this embodiment combustion air is supplied via line 60 to combustor 21B, present in combustor-heat exchanger apparatus IIB and preferably a fluidized bed combustor, for combusting fuel, such as low priced solid fuel, supplied from source 22. Combustion air is pre-heated prior to being supplied to combustor 21B using heat present in gases supplied to gas/air pre-heater 68 present in heat exchanger apparatus IB so that pre-heated combustion air is supplied to combustor 21B via line 60. Combustion products produced by combustor 21B are supplied to high pressure superheater 23B for producing superheated, high pressure steam and from which heat depleted combustion products exit. These products are supplied via line 35B to vaporizer 34B present in combustor-heat exchanger apparatus IIB, for producing high pressure steam from a product of heat exchanger apparatus IB, namely further pre-heated steam condensate produced by pre-heater 65. The high pressure steam produced is supplied to superheater 23B and the further heat depleted combustion products exiting vaporizer 34B are supplied to economizer 30B. Economizer 30B produces pre-heated steam condensate which is furnished to pre-heater 65 present in heat exchanger apparatus IB. The cooled combustion products exiting economizer 30B are supplied by fan 40B, to the exit turbine 15 of gas turbine unit 12 where they are combined with the exhaust gases exiting turbine 15. The combined product produced is supplied to low pressure superheater 31B present in heat exchanger apparatus 19 producing low pressure, superheated steam while the product exiting low pressure superheater 31B is supplied to pre-heater 65 for further pre-heating preheated steam condensate supplied from economizer 30B.

The superheated, high pressure steam produced by high pressure superheater 23B is supplied to high pressure steam turbine 61, expands therein and produces power for driving electric generator 25B while the exhaust steam exiting the high pressure steam turbine is supplied to low pressure superheater 31B. Superheated, low pressure steam exiting low pressure superheater 31B is supplied to low pressure steam turbine 62 for producing further power and also driving electric generator 25B. The low pressure, exhaust steam exiting low pressure steam turbine 62 is supplied to steam condenser 27B for producing steam condensate which is supplied to economizer 30B via line 38B by pump 29B.

Figure 4:
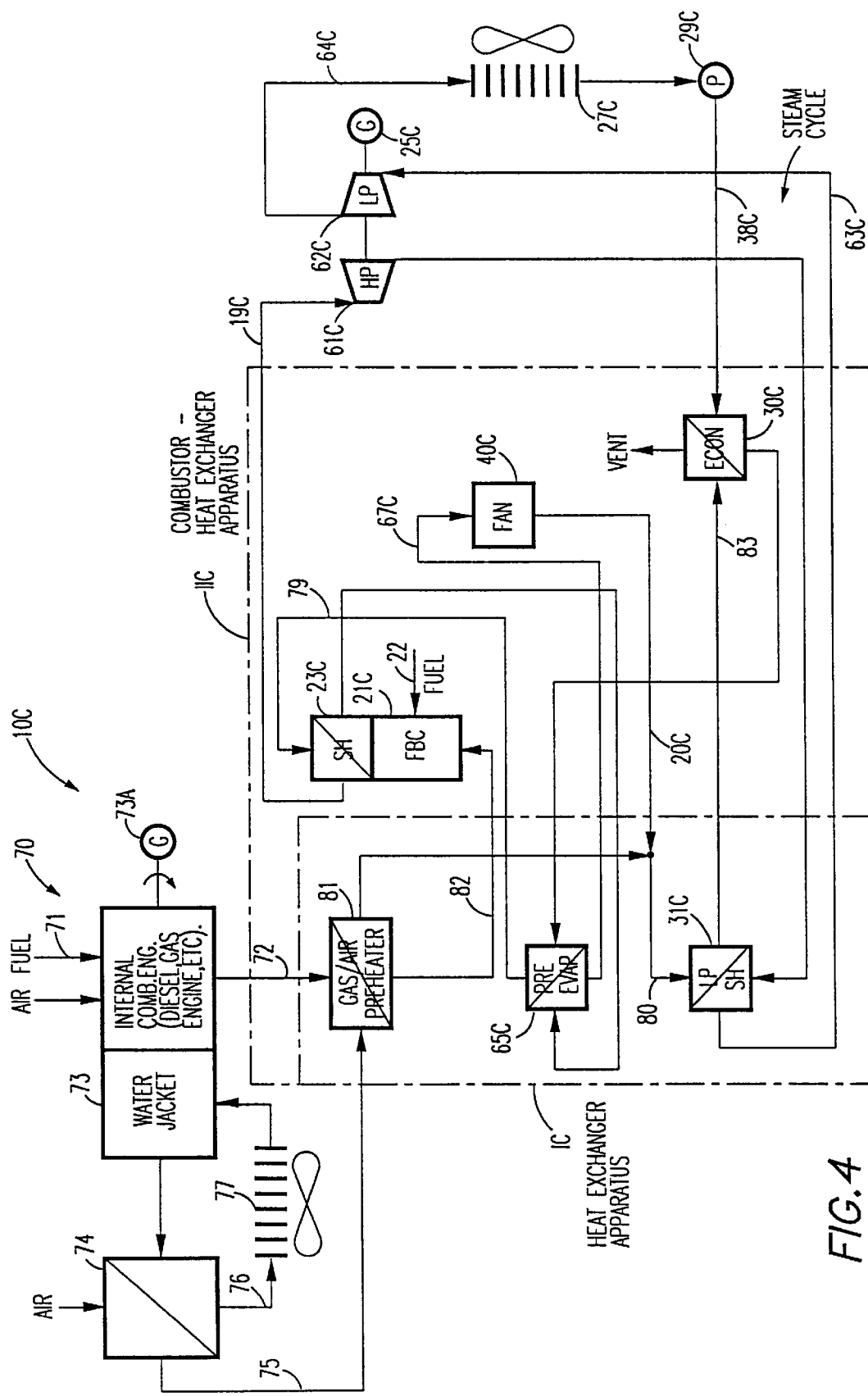
FIG. 4 is a fourth embodiment of the present invention utilizing a prime mover in the form of an internal combustion engine.

In the embodiment disclosed with reference to FIG. 4, designated in FIG. 4 as 10C, prime mover taking the form of an internal combustion engine, such as diesel engine, gas engine, etc., 70 produces power and drives electric generator 73A. Coolant or cooling water present in water jacket 73, used for cooling the engine, is supplied to air/coolant heat exchanger 74 for heating combustion air and producing pre-heated combustion air, exiting heat exchanger 74 via line 75. Heat depleted cooling water exiting heat exchanger 74 via line 76 is furnished to cooler 77 for producing further heat depleted cooling water which is supplied back to water jacket 73. Line 75 supplies pre-heated combustion air exiting heat exchanger 74 to air pre-heater heat exchanger 81, present in heat exchanger apparatus IC, for utilizing heat present in the hot exhaust gases supplied from internal combustion engine 70 via line 72 and from which heat depleted exhaust gases exit. Further pre-heated combustion air, produced by air pre-heater 81, is furnished to combustor 22, present in combustor-heat exchanger apparatus IIC and preferably a fluidized bed combustor, for combusting solid fuel, such as low priced solid fuel, supplied from fuel source 22. Heat depleted exhaust gases exiting air pre-heater 81 are supplied to low pressure superheater 31C. Combustion products exiting combustor 21C enter high pressure superheater 23C for producing superheated, high pressure steam which is supplied to high pressure steam turbine 61C while heat depleted combustion products exit the superheater and are supplied, via line 35C, to vaporizer.65C present in heat exchanger apparatus IC. Vaporizer 65C produces a heated water product and a product of heat exchanger apparatus IC, namely high pressure steam which is supplied to high pressure superheater 23C while further heat depleted, combustion products exiting vaporizer 65C are combined with heat depleted, exhaust gases exiting air pre-heater 81 using fan 40C. The combined, hot products produced are supplied to low pressure superheater 31C, present in heat exchanger apparatus IC, for producing low pressure, superheated steam from exhaust steam exiting high pressure steam turbine 61C. The cooled products exiting low pressure superheater 31C are furnished to economizer 30C, present in combustor-heat exchanger apparatus IIC for producing pre-heated steam condensate which is supplied to vaporizer 65C, while further cooled products exiting economizer 30C are vented to the atmosphere.

The superheated, high pressure steam supplied to the high pressure steam turbine 61C from high pressure superheater 23C expands therein, produces power for driving electric generator 25C while the exhaust steam exiting the high pressure steam turbine is supplied to low pressure superheater 31C. Superheated, low pressure steam exiting low pressure superheater 31C is supplied to the low pressure steam turbine 62C for producing further power and also driving electric generator 25C with the appropriate shaft provided. The low pressure, exhaust steam exiting low pressure steam turbine 62C is supplied to steam condenser 27C, preferably an air cooled steam condenser, for producing steam condensate. Steam condensate exiting steam condenser 27C is supplied to economizer 30C via line 38C by pump 29C thus completing the steam cycle.

Examples of low priced fuel previously mentioned can be oil shale, peat, culm, municipal waste, residual oil, heavy residue oil, asphaltene, etc., or a mixture of oil shale or peat with residue oil, heavy residue or asphaltene. Alternatively, limestone can be added during the combustion of residue oil, heavy residue oil, or asphaltene. Such fuels and mixtures are low priced fuels due to the relative difficulty in handling them.

In accordance with the present invention, when limestone particulate or particles are present in the combustor, e.g., when oil shale is combusted, or limestone is added during the combustion of another fuel such as oil residue, such particulate reacts with sulfur, e.g., $SO_x$, present and thus reduces environmental danger. In particular, in embodiments disclosed with reference to FIGS. 3 and 4, the heat exchanger or recovery components present in heat exchanger apparatus IB. combustor-heat exchanger apparatus IIB, apparatus IC, combustor-heat exchanger apparatus IIC, respectively, should be constructed to take advantage of the presence of limestone particulate. In other words, such heat exchanger apparatus should be constructed so that sufficient limestone particulate or particles reach the heat exchanger components downstream of the intake to the gas turbine or internal combustion exhaust gases. Consequently, sulfur, e.g., $SO_x$, present in the exhaust gases of the diesel engine disclosed with reference to FIG. 4, will react with limestone particulate present in the fluidized bed combustor exhaust gases thus reducing environmental danger. Therefore, in the embodiments disclosed with reference to FIGS. 3 and 4, it is advantageous to construct the heat exchanger components downstream of the fluidized bed combustor in one module.

The advantages and improved results furnished by the method and apparatus of the present invention arc apparent from the foregoing description of the preferred embodiments of the invention. Various changes and modifications may be made without departing from the spirit and scope of the inventions described in the appended claims.

What is claimed is:

1. A power plant comprising:
   a) a prime mover for burning fuel and producing work and hot exhaust gases;
   b) a heat exchanger apparatus comprising a low pressure superheater and a pre-heater and responsive to said hot exhaust gases and to warmed pre-heated steam condensate for converting the latter into a heated water product, and for producing heat depleted exhaust gases, said low pressure superheater responsive to said hot exhaust gases and exhaust steam for converting the latter into superheated, low pressure steam and producing said heat depleted hot exhaust gases that are supplied to said pre-heater and produce further heat-depleted hot exhaust gases, a low pressure steam turbine expanding said superheated, low pressure steam and producing low pressure exhaust steam, and a condenser condensing said low pressure exhaust steam to steam condensate;
   c) a combustor-heat exchanger apparatus comprising a superheater, an economizer, a pre-heater/vaporizer and a combustor responsive to said further heat-depleted exhaust gases, and burning low priced solid fuel for supplying additional heat to a product of said heat exchanger apparatus, such that said combustor produces combustion products;
   d) said pre-heater/vaporizer responsive to said combustion products and warmed pre-heated steam condensate to produce high-pressure steam that is supplied to said superheater;
   e) said superheater responsive to said heat supplied by said combustor and to said high-pressure steam for converting the latter to superheated high pressure steam;

f) a high pressure steam turbine for expanding said superheated high pressure steam and producing power and said exhaust steam; and g) said economizer responsive to said combustion products and to said steam condensate for producing said pre-heated steam condensate.

2. A power plant according to claim 1 wherein said combustor is a fluidized bed combustor and said heat depleted exhaust gases serve to fluidize said combustor.

3. A power plant according to claim 1 wherein said condenser is an air-cooled condenser.

4. A power plant according to claim 1 wherein said low pressure steam turbine is separate from said high pressure steam turbine.

5. A power plant comprising:

a) a prime mover comprising a gas turbine unit having a compressor for producing compressed air, a burner for combusting fuel in said compressed air to produce (to produce) heated compressed air, and a turbine for expanding said heated compressed air and driving said compressor and producing work and hot exhaust gases;

b) a low pressure superheater responsive to said hot exhaust gases and to exhaust steam for converting the latter into superheated, low pressure steam and producing heat depleted exhaust gases;

c) a low pressure steam turbine for expanding said superheated, low pressure steam and producing low pressure exhaust steam;

d) a combustor-heat exchanger apparatus comprising a high pressure superheater, a pre-heater/vaporizer, an economizer and a combustor for receiving further heat-depleted exhaust gases, and burning low priced solid fuel such that said combustor produces combustion products;

e) said high pressure superheater responsive to said combustion products and to high pressure steam for converting the latter into superheated high-pressure steam and for producing heat depleted combustion products;

f) a high pressure steam turbine for expanding said superheated, high pressure steam and producing power and exhaust steam;

g) a steam condenser for condensing said low pressure exhaust steam supplied from said low pressure steam turbine to steam condensate;

h) said pre-heater/vaporizer responsive to said heat-depleted combustion products and further pre-heated steam condensate for producing high pressure steam and from which further heat-depleted combustion products exit;

i) said economizer responsive to said further heat-depleted combustion products and to said steam condensate for producing pre-heated steam condensate; and j) a pre-heater for further pre-heating steam condensate exiting said economizer using heat contained in said heat-depleted exhaust gases and producing further heat-depleted, exhaust gases and further pre-heated steam condensate that is supplied to said pre-heater/vaporizer.

6. A power plant according to claim 1 wherein said prime mover is a gas turbine unit having a compressor for producing compressed air, a burner for combusting fuel in said compressed air to produce heated compressed air, and a turbine for expanding said heated compressed air and driving said compressor.

7. A power plant according to claim 1 wherein said combustor combusts culm.

8. A power plant according to claim 1 wherein said combustor combusts municipal waste.

9. A power plant according to claim 7 wherein oil shale is added to said combustor.

10. A power plant according to claim 8 wherein oil shale is added to said combustor.

11. A power plant according to claim 7 wherein limestone is added to said combustor.

12. A power plant according to claim 5 wherein said combustor combusts culm.

13. A power plant according to claim 5 wherein said combustor combusts municipal waste.

14. A power plant according to claim 12 wherein oil shale is added to said combustor.

15. A power plant according to claim 1 wherein said combustor combusts oil shale.

16. A power plant according to claim 12 wherein limestone is added to said combustor.

17. A power plant according to claim 1 wherein said combustor combusts peat.

18. A power plant according to claim 5 wherein said combustor combusts peat.

* * * * *